United States Patent [19]

Weikmann

[11] Patent Number: 5,600,818
[45] Date of Patent: Feb. 4, 1997

[54] DATA PROTECTIVE MICROPROCESSOR CIRCUIT FOR PORTABLE DATA CARRIERS, FOR EXAMPLE CREDIT CARDS

[75] Inventor: Franz Weikmann, Munich, Germany

[73] Assignee: GAO Gesellschaft fuer Automation und Organisation, Munich, Germany

[21] Appl. No.: 590,872

[22] Filed: Jan. 24, 1996

Related U.S. Application Data

[63] Continuation of Ser. No. 358,572, Dec. 13, 1994, abandoned, which is a continuation of Ser. No. 879,007, May 6, 1992, abandoned.

[30] Foreign Application Priority Data

May 8, 1991 [DE] Germany .......................... 41 15 152.6

[51] Int. Cl.$^6$ ...................................................... G06F 1/24
[52] U.S. Cl. .................. 395/490; 364/264; 364/264.5; 364/259.2; 364/286.4; 364/DIG. 1; 395/800; 395/493
[58] Field of Search ................................... 395/490, 800, 395/493, 182.21

[56] References Cited

U.S. PATENT DOCUMENTS

| | | | |
|---|---|---|---|
| 4,328,542 | 5/1982 | Anastas | 395/775 |
| 4,488,256 | 12/1984 | Zolnowsky | 395/400 |
| 4,519,036 | 5/1985 | Green | 395/575 |
| 4,521,853 | 6/1985 | Guttag | 395/425 |
| 4,525,599 | 6/1985 | Curran | 380/4 |
| 4,558,176 | 12/1985 | Arnold | 380/4 |
| 4,584,665 | 4/1986 | Vrielink | 364/900 |
| 4,689,766 | 8/1987 | Kent | 395/182.21 |
| 4,975,878 | 12/1990 | Boddu | 365/189.07 |
| 5,023,776 | 6/1991 | Gregor | 395/449 |
| 5,067,077 | 11/1991 | Wakimoto | 395/400 |
| 5,099,516 | 3/1992 | Durkin | 380/4 |
| 5,263,158 | 11/1993 | Janis | 395/600 |
| 5,341,497 | 8/1994 | Younger | 395/575 |

FOREIGN PATENT DOCUMENTS 2738113  3/1978  Germany .

*Primary Examiner*—Eric Coleman
*Attorney, Agent, or Firm*—Foley & Lardner

[57] ABSTRACT

A data protective microprocessor circuit for preventing access to data or programs stored in memories, includes a microprocessor, a memory for storing an operating system, at least one memory with an individual secondary program, a circuit for monitoring a particular valid address and generating a first signal, a circuit for monitoring particular contents of a microprocessor program counter and generating a second signal, and a circuit for generating an inhibit signal based on said first and second signals.

19 Claims, 2 Drawing Sheets

DATA PROTECTIVE MICROPROCESSOR CIRCUIT FOR PORTABLE DATA CARRIERS, FOR EXAMPLE CREDIT CARDS

This application is a continuation of application Ser. No. 08/358,572, filed Dec. 13, 1994, now abandoned, which is a continuation of application Ser. No. 07/879,007, filed May 6, 1992, abandoned.

BACKGROUND OF THE INVENTION

1. Field of the Invention

The present invention relates to a data protective microprocessor circuit according to the preamble of claim 1.

Microprocessor circuits of the stated type are used chiefly in so-called chip cards, i.e. identity cards, credit cards, posting cards and the like, which are equipped with integrated circuits. However, the microprocessor circuits can also be used in so-called payment modules which communicate with the abovementioned cards via suitable interfaces.

2. Description of the Prior Art

To facilitate the understanding of the invention, the following description will relate to the application of the microprocessor circuit in cards.

A card with a microprocessor was described for the first time in DE-OS 27 38 113. One of the essential advantages of such a card is the versatile possibilities of use by the card owner. The microprocessor contained in the integrated circuit or the card and the corresponding storage means permit extensive data processing in the card itself, whereas cards provided with a magnetic strip, for example, make it necessary to perform all data processing operations externally.

The card manufacturer can equip the microprocessor with a resident operating system which performs fundamental functions, for example procedures for comparing an externally inputted code with a stored code and the like. The memories belonging to the microprocessor serve not only to store the operating system but also to store certain applications and parameters which are necessary e.g. for security checking and must be kept absolutely secret.

A versatile application of the cards is obtained if one starts out from an operating system with associated programs, defines certain interfaces and reserves a memory or memory area for a so-called secondary program. The card manufacturer provides for the user, i.e. the card-issuing organization, a memory or memory area for programming its secondary program. The organization can fix specific operations in this secondary program which are independent of the operating system and relate only to the particular organization.

A further conceivable variant is for not only one organization to program its secondary program into the prefabricated chip card but for several different organizations to store their corresponding programs.

In any case one must make sure that security-relevant data which are part of the operating system or the individual secondary programs are protected from unauthorized access.

SUMMARY OF THE INVENTION

The invention is based on the problem of providing a circuit which ensures by simple measures that a secondary program can only access those memory areas which are explicitly enabled for access.

This problem is solved according to the invention by the features stated below.

According to a first embodiment of the invention the data protective circuit comprises a first means for monitoring the particular address selected, a second means for monitoring the microprocessor program counter and a further means for linking the signals of the monitoring means to produce an inhibit signal.

Due to the monitoring of the program counter reading, the protective circuit is always able to detect which of the loaded programs is being executed at any moment. If the address called by the particular active program is simultaneously monitored, a reaction to illegal storage access can easily be had via the combinatorial circuit, for example by conducting a reset signal to the microprocessor.

The protective circuit is decoupled from the actual microprocessor but preferably provided on the integrated circuit having the microprocessor. By presetting corresponding setpoints for the particular program counter reading and the particular addresses one can define any desired memory areas which are permissible or impermissible for a certain user. If certain memory areas are to be blocked selectively for reading or writing, the write/read signal from the microprocessor is also processed accordingly in the protective circuit.

In another embodiment of the invention, the protective circuit is formed by a microprocessor, referred to as a security processor, which monitors the microprocessor executing the secondary programs and referred to as the working processor. This measure puts the working processor under the constant control of the security processor, which enables the operation of the working processor after each reset and the following initialization phase. If the security processor ascertains that the working processor executing a certain secondary program is accessing an illegal memory area the security processor applies a blocking signal to a non-masked interrupt input or the reset input of the working processor.

Since the purpose of the security processor is to monitor all individual steps of the working processor, it will expediently work at a higher clock frequency than the working processor.

If several secondary programs are stored in the memory associated with the working processor, one must prevent not only access to the operating system but also access to other secondary programs. The necessary setpoints for this are expediently stored as limiting values in a memory associated with the security processor. For this purpose a limit memory is associated with the security processor to contain the limiting values for the monitored addresses and for the possible contents of the program counter of the working memory. These areas cannot be accessed by the working processor.

The execution of a secondary program can also be blocked in case of unauthorized storage access by enabling only a certain set of interpretable instructions. The instructions of the secondary program are then executed under the control of the operating system, it being ensured that only those areas are accessed which access is explicitly allowed for. The program counter of the microprocessor thus never comes under the control of the secondary program.

Along with the abovementioned possibilities, the invention involves a further variant in which several freely programmable memory areas are provided whose address spaces are identical except for at least one highest-order position. The particular highest-order position associated with a memory area is loaded into an auxiliary register before the addressing of the memory area. Whenever the data contents of the auxiliary register changes, a blocking signal is generated. Upon each load operation of the auxiliary register the microprocessor defines a certain user. If this user accesses an illegal memory area, which causes a corresponding change in the auxiliary register contents, the protective circuit monitoring the content of the auxiliary register generates a blocking signal.

BRIEF DESCRIPTION OF THE DRAWINGS

Further advantages and developments of the invention can be found in the claims and the embodiment examples, which are described in the following with reference to the drawings, wherein:

DETAILED DESCRIPTION OF THE PREFERRED EMBODIMENTS

Figure 1:
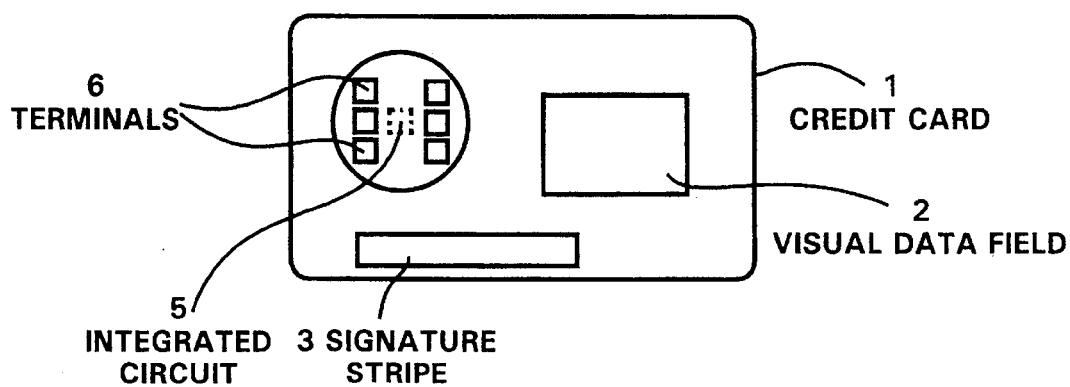
FIG. 1 shows a data carrier with an integrated circuit.

FIG. 1 shows the structure of a data carrier, for example a credit card 1, with visual data field 2, signature stripe 3 and an integrated circuit 5 with terminals 6 embedded in the card body. The terminals are designed here as connector contacts 6 in the form of two rows. The structure of such cards is fundamentally known and shall not be explained in more detail here. The mode of use and data processing in conjunction with such credit cards is also known. Via connector contacts 6 a data exchange takes place with a terminal, for example in an automatic money dispenser or the like. In the integrated circuit of the credit card security routines are executed, for example, which are necessary for proving the entitlement of the card user.

Figure 2:
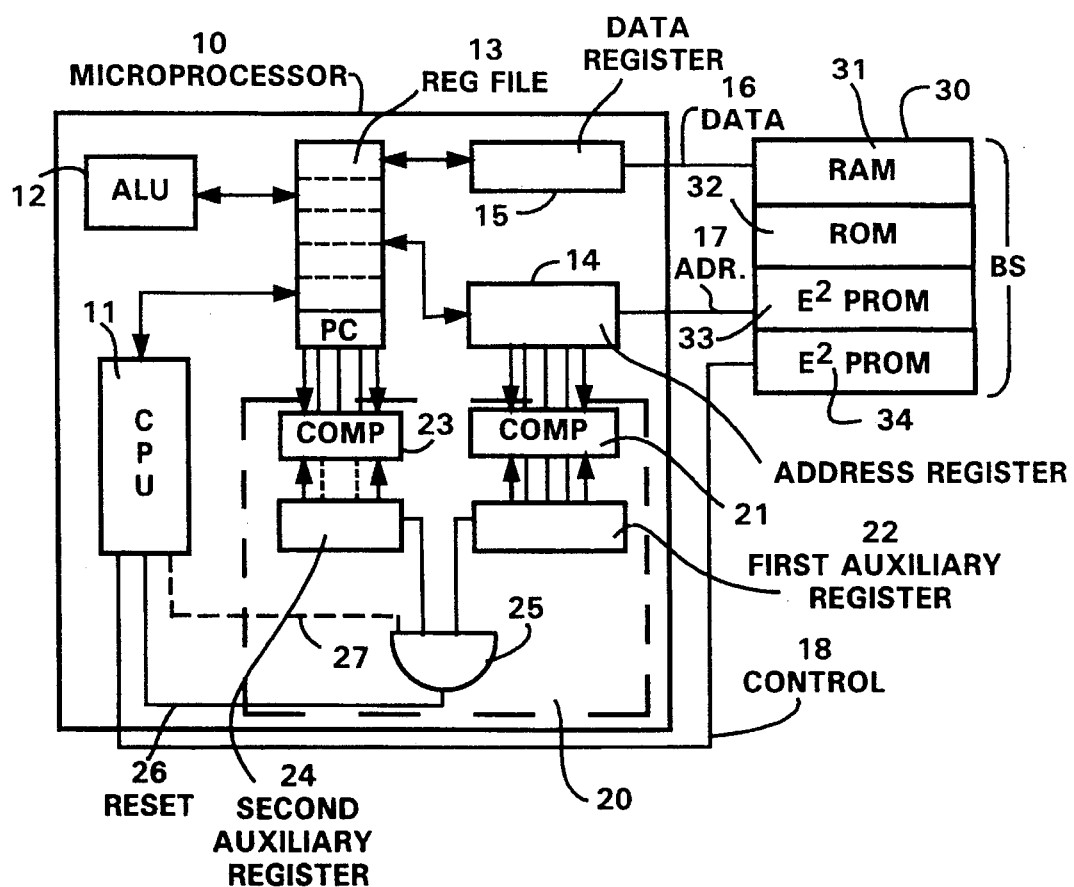
FIG. 2 shows a block diagram of an integrated circuit provided for a data carrier, having a microprocessor, memory and blocking circuit.

FIG. 2 shows a first embodiment of an integrated circuit as it is incorporated in the credit card. A microprocessor 10 contains a control unit 11 which is connected via a control line 18 with a memory array 30, an arithmetic and logic unit (ALU) 12, a register file 13, an address register 14 and a data register 15. A register of register file 13 serves as a program counter whose content determines which address of a memory array 30 is accessed to fetch an instruction of the secondary program stored there. The instruction causes, for example, a data item to be read out of a certain address of the memory. For this purpose an address is stored in address register 14 to determine which address is accessed upon the next storage access. The address is fed via an address bus 17 to memory array 30. The data is written to memory 30 or read out of memory 30 pass via a data bus 16 to data register 15 and from there to a register of register file 13.

Memory array 30 includes in the shown example a read/write memory (RAM) 31, a read-only memory (ROM) 32 and E$^2$PROM 33. These memory areas 31, 32 and 33 belong to the operating system (BS) which partly contains security-relevant data which must be kept absolutely secret. In order to ensure this in the simple embodiment according to FIG. 2, access to all memory areas 31, 32, 33 of the operating system (BS) is blocked for a user from his secondary program.

If the manufacturer wants to make an area of the operating system accessible to the user, whereby this area must of course contain no security-relevant data, protective circuit 20 described in the following must be accordingly adapted to the remaining addresses of the operating system to be protected. By making an area of the operating system accessible to the user from his secondary program one can enable him, for example, to use it for a routine, e.g. for comparing an inputted number sequence with a number sequence stored—in protected fashion—in the operating system, thereby making it easier for him to write his secondary program.

Memory array 30 also contains a memory area 34 for a secondary program. This secondary program can be loaded by an organization which is not identical with the manufacturer of the card. For this purpose memory area 34 is designed as an E$^2$PROM. The secondary program which is loaded by the user occupies storage locations w to x, while the operating system occupies storage locations 0 to w−1.

The secondary program contains special routines and data for ascertaining e.g. whether the service demanded by the card owner, e.g. a dispensation of money, is allowed, which depends e.g. on the card owner's account balance. After the card owner has introduced the card into a machine a data exchange takes place between the machine and microprocessor 10. After initialization and the execution of certain routines by the operating system, further operation can take place by the secondary program stored in memory area 34, for example by program counter PC in register file 13 being set to address w. This causes the instruction of the secondary program stored in the first storage position of memory area 34 to be called next.

To prevent the secondary program from accessing addresses in memory areas 31, 32 and 33, an inventive protective circuit 20 is provided. This circuit is present in addition to microprocessor 10 and memory array 30. All components are preferably designed as an integrated circuit on one chip.

Protective circuit 20 contains a first comparator 21, a first auxiliary register (HRI) 22, a second comparator 23, a second auxiliary register (HRII) 24, an AND gate 25 and an output line 26 leading from AND gate 25 to control circuit 11 of microprocessor 10.

Comparator 21 compares the contents of address register 14 and auxiliary register 22, while comparator 23 compares the contents of the program counter with the contents of auxiliary register 24.

The contents of auxiliary registers 22 and 24 can be "preprogrammed" by the manufacturer in hard-wired logic. The contents can also be loaded into the auxiliary register by the operating system from protected memories in the course of initialization of the microprocessor.

Address w at which the secondary program in memory area 34 begins is loaded into auxiliary register 22. Value w is likewise stored in auxiliary register 24. While comparator 21 provides a signal if the address contained in address register 14 is smaller than address w stored in auxiliary register 22 (this means that the secondary program is accessing an illegal storage position between 0 and w−1), comparator 23 provides a signal if the contents of program counter PC of register file 13 is greater than or equal to value w stored in auxiliary register 24, the latter meaning that the secondary program is being executed.

If both comparators 21 and 23 provide a signal, this means that the secondary program is being executed and that an illegal address is being accessed which is outside the address space of the secondary program. AND gate 25 provides for example a reset signal via line 26 to control unit 11, which therefore blocks a further execution of the secondary program.

To block writing or reading selectively, the write/read signal from the microprocessor is also processed in protective circuit 20 (see line 27).

In a modification of the embodiment according to FIG. 2, additional comparators with associated auxiliary registers can be provided if further memory areas are present for further secondary programs to be loaded by different users.

Figure 3:
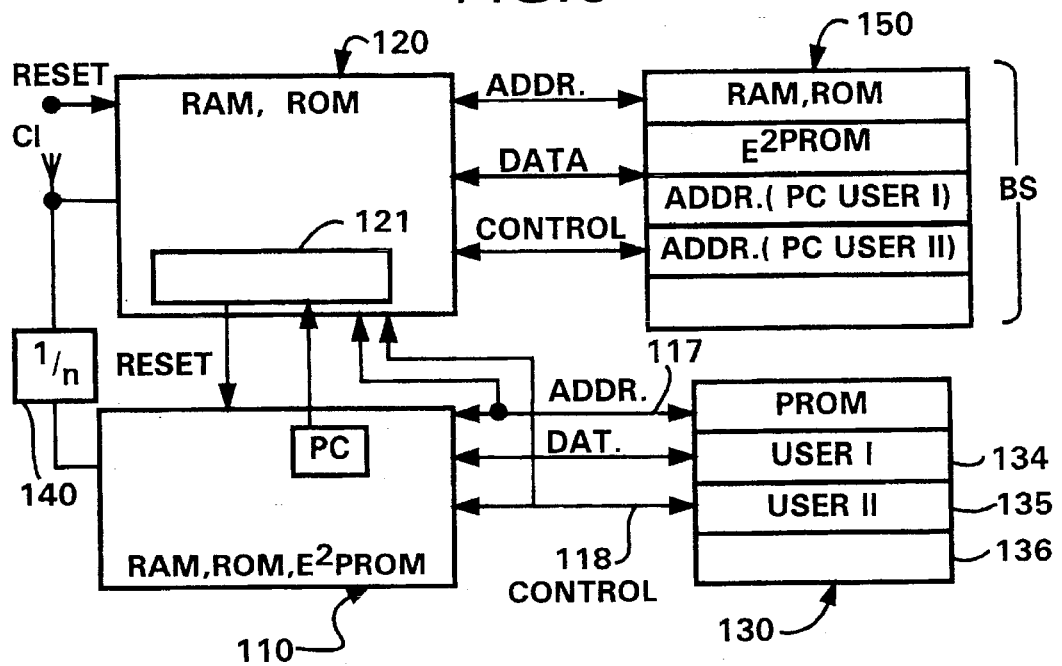
FIG. 3 shows a block diagram of an integrated circuit provided for a data carrier, having a working processor and a security processor along with associated memories.

FIG. 3 shows a second embodiment of the invention. A working processor 110 with associated memory array (PROM) 130 has substantially the same function as microprocessor 10 with associated memory array 30 in FIG. 2.

The protective circuit here is a second processor, namely a security processor 120 having its own memory array 150.

An operating clock signal C1 controls the working speed of security processor 120. Via a divider circuit 140 the frequency of the timing signal is divided by n so that working processor 110, which receives the output signal from divider circuit 140, works at only 1/nth of the speed of security processor 120.

Security processor 120 contains a control unit 121 which feeds a reset signal to working processor 110 upon detection of unauthorized storage access by a secondary program. For this purpose address bus 117 and control line 118 between working processor 110 and memory array 130 are monitored. The program counter (PC) of the working processor is also monitored. Both the data on address bus 117 and the content of program counter PC are compared with certain limiting values for each secondary program.

Memory array 130 for working processor 110 contains several memory areas for different users, who are referred to here as User I, User II . . . . As mentioned above, these secondary programs are loaded separately by organizations distinct from the card manufacturer. Memory areas 134, 135 and 136 of memory array 130 are preferably designed as non-volatile memory (e.g. E²PROM).

When a certain secondary program, e.g. the program stored in memory area 134 of User I, is executed by working processor 110 after initialization, security processor 120 compares the particular address signals and program counter contents with the associated limiting values for this user. These limiting values are stored in memory array 150 as a part of the operating system of security processor 120. When e.g. the secondary program of User I is executed the content of program counter PC may only cover a certain range of values. Also, the addresses on address bus 117 must correspond only to this range of values. In case of a difference security processor 120 feeds the reset signal to working processor 110 to block the execution of the secondary program.

Figure 4:
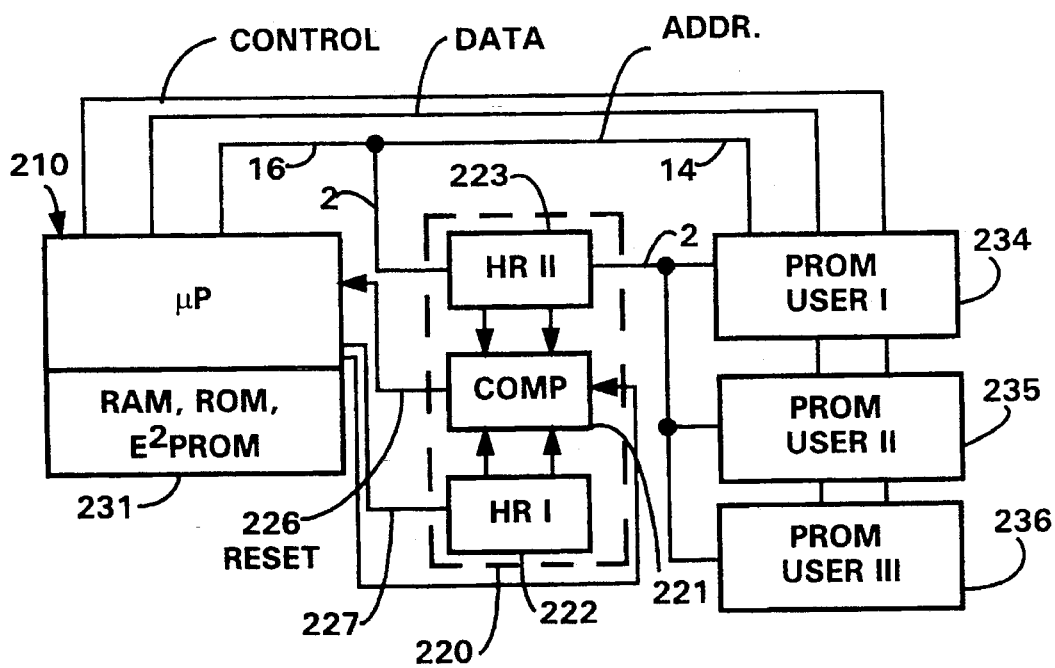
FIG. 4 shows a block diagram of an integrated circuit provided for a data carrier, having a microprocessor, memory and blocking circuit.

FIG. 4 shows a third embodiment of the invention whereby operating system memory 231 associated with microprocessor 210 is disposed separately from memory areas 234, 235 and 236. The latter serve to take up secondary programs for three different users. Between microprocessor 210 and memories or memory areas 234, 235, 236 there are address, data and control buses.

The address space for accessing (PROM) memory areas 234, 235, 236 includes for example sixteen bits, the two highest-order bits fixing which memory or memory area is intended for the current access. Altogether four memories or memory areas can be selected (00, 01, 10, 11) by the two highest-order bits.

Before execution of a secondary program the operating system, for example controlled by user-specific parameters, inputs a value, which in the present case comprises two bits, into a first auxiliary register 222 (HRI). When the secondary program in memory 234 is to be executed, for example, and this memory has addresses with the bit combination "01" in the two highest-order bit locations, the value "01" is stored in memory register 222.

At the beginning of the execution of the secondary program, i.e. at the first addressing, the two highest-order positions of the address register are loaded by the address bus into a second auxiliary register (HRII) 223, and a comparator 221 comparing the contents of auxiliary registers 222 and 223 is activated by a corresponding control signal 228 from the microprocessor. As long as the contents of auxiliary program 222 matches auxiliary register 223, this means that the secondary program is moving only within the address space (memory area 234) associated with it. If a different address space is accessed this changes the two highest-order positions of the address signal and thus the content of auxiliary register 223. This is detected by comparator 221 which feeds a reset signal to microprocessor 210 via a line 226.

I claim:

1. A data protective microprocessor circuit for preventing an unauthorized access to data or programs stored in memories, comprising:

a microprocessor;

a memory for storing an operating system;

at least one programmable memory for storing an individual secondary program;

first means for monitoring a particular valid address and generating a first signal;

second means for monitoring particular contents of a program counter to detect which of the stored programs are being executed and generating a second signal; and third means for generating an inhibit signal based on said first and second signals and providing said inhibit signal to the microprocessor, whenever a program accessing an illegal address space is executed, said inhibit signal being provided to reset said microprocessor so as to forbid further execution of said program accessing the illegal address space until said program is restarted by said microprocessor after the reset.

2. The microprocessor circuit of claim 1, wherein the first, second and third means are provided in hard-wired logic in a circuit including the microprocessor.

3. The microprocessor circuit of claim 2, wherein said first means comprises a first auxiliary register and a first comparator, and the second means comprises a second auxiliary register and a second comparator, the first and second auxiliary registers having predetermined setpoints for reading the particular valid address and the program counter, and the first and second comparators being connected the first and second auxiliary registers, respectively, and one of the program counter and an address register of the microprocessors.

4. The microprocessor circuit of claim 2, wherein the third means is an AND gate connected to outputs of the comparators.

5. The microprocessor circuit of claim 1, wherein said first means comprises a first auxiliary register and a first comparator, and the second means comprises a second auxiliary register and a second comparator, the first and second auxiliary registers having predetermined setpoints for reading the particular valid address and the program counter, and the first and second comparators being connected the first and second auxiliary registers, respectively, and one of the program counter and an address register of the microprocessors.

6. The microprocessor circuit of claim 5, wherein the setpoints are located in an area of the operating system protected from access and are loaded into the first and second auxiliary registers during initialization of the microprocessor.

7. The microprocessor circuit of claim 1, wherein the third means is an AND gate connected to outputs of the comparators.

8. The microprocessor circuit of claim 1, wherein the inhibit signal from the third means is provided to an interrupt input of the microprocessor.

9. The microprocessor circuit of claim 1, wherein the inhibit signal from the third means is provided to a reset input of the microprocessor.

10. The microprocessor circuit of claim 1, wherein a write/read signal from the microprocessor is processed in the third means to inhibit writing or reading selectively.

11. A data protective microprocessor circuit for preventing unauthorized access to data or programs stored in memories, comprising:

a first microprocessor functioning as a working processor;

a memory for storing an operating system;

at least one programmable memory for storing an individual secondary program; and a protective circuit for monitoring contents of a program counter to detect which of the stored programs are being executed and a particular valid address and generating an inhibit signal, whenever a program accessing an illegal address space is executed and providing said inhibit signal to the working processor, said inhibit signal being provided to reset said working processor so as to forbid further execution of said program accessing the illegal address space until said program is restarted by said working processor after the reset.

12. The microprocessor circuit of claim 11, wherein the protective circuit includes a second microprocessor functioning as a security processor.

13. The microprocessor circuit of claim 12, wherein the security processor and the working processor controlling the secondary program are formed in the same integrated circuit.

14. The microprocessor circuit of claim 12, wherein the security processor is operated at a higher clock frequency than the working processor.

15. The microprocessor circuit of claim 12, wherein the security processor has a limit memory for storing limiting values for the particular valid address monitored by the protective circuit and the contents of the program counter in the working processor, said limiting values and contents being arranged to prevent access by the working processor.

16. A data protective microprocessor circuit for preventing unauthorized access to data or programs stored in memories, comprising:

at least one microprocessor;

a memory for an operating system and at least one programmable memory for storing individual secondary programs;

auxiliary register means connected to said memory, wherein a plurality of freely programmable memory areas in said programmable memory are provided with identical address spaces except for at least one highest-order position, the highest-order position associated with a memory area being loaded into the auxiliary register means before addressing of a memory area, and an inhibit signal being generated and provided to the microprocessor when a change in the contents of the auxiliary register means occurs, said inhibit signal being provided to reset said microprocessor so as to forbid further execution of said program accessing the illegal address space until said program is restarted by said microprocessor after the reset.

17. The microprocessor circuit of claim 16, wherein the auxiliary register means comprises two auxiliary registers and wherein the highest-order position of an address bus are loaded into the two auxiliary registers which are connected with a comparator.

18. The microprocessor circuit of claim 16, wherein the inhibit signal is provided to the microprocessor concurrently with the change in the contents of the auxiliary register.

19. A micro-processor circuit for controlling access to a program stored in a memory, comprising:

a micro-processor;

a first memory for storing an operating system;

a second memory for storing application programs;

a program counter register which holds an address of an instruction being performed;

an address register having addresses of data for the program; and a comparator monitoring contents of the address register and the program counter register to detect which of the stored programs are being executed and providing an inhibit signal to the microprocessor whenever the contents are not within a predetermined address range defining an authorized zone of the program and an assigned memory area, said inhibit signal being provided to reset said microprocessor so as to forbid further execution of said program accessing the illegal address space until said program is restarted by said microprocessor after the reset.

* * * * *